(12) United States Patent
Callas et al.

(10) Patent No.: US 8,413,446 B2
(45) Date of Patent: Apr. 9, 2013

(54) FUEL INJECTOR ARRANGEMENT HAVING POROUS PREMIXING CHAMBER

(75) Inventors: James J. Callas, Peoria, IL (US); Scott B. Fiveland, Metamora, IL (US); Robert J. Moffat, Los Altos, CA (US)

(73) Assignee: Caterpillar Inc., Peoria, IL (US)

( * ) Notice: Subject to any disclaimer, the term of this patent is extended or adjusted under 35 U.S.C. 154(b) by 1073 days.

(21) Appl. No.: 12/314,416

(22) Filed: Dec. 10, 2008

(65) Prior Publication Data
US 2010/0139281 A1 Jun. 10, 2010

(51) Int. Cl.
*F02C 1/00* (2006.01)
*F02C 7/00* (2006.01)

(52) U.S. Cl.
USPC .............................. 60/737; 60/779

(58) Field of Classification Search .............. 60/737, 60/756, 738, 748, 749, 740, 746, 779, 39.091, 60/39.11; 431/346
See application file for complete search history.

(56) References Cited

U.S. PATENT DOCUMENTS

| | | | | |
|---|---|---|---|---|
| 3,579,983 A * | 5/1971 | Caruel et al. | | 60/738 |
| 3,937,007 A * | 2/1976 | Kappler | | 60/777 |
| 3,954,389 A | 5/1976 | Szetela | | |
| 4,070,826 A * | 1/1978 | Stenger et al. | | 60/748 |
| 4,271,675 A * | 6/1981 | Jones et al. | | 60/737 |
| 5,081,844 A * | 1/1992 | Keller et al. | | 60/737 |
| 5,402,633 A * | 4/1995 | Hu | | 60/776 |
| 5,438,834 A | 8/1995 | Vuillamy et al. | | |
| 5,490,389 A * | 2/1996 | Harrison et al. | | 60/737 |
| 5,680,766 A * | 10/1997 | Joshi et al. | | 60/746 |
| 5,761,897 A * | 6/1998 | Kramer | | 60/776 |
| 5,884,471 A * | 3/1999 | Anderson et al. | | 60/39.23 |
| 6,050,096 A * | 4/2000 | Senior | | 60/748 |
| 6,174,160 B1 | 1/2001 | Lee et al. | | |
| 6,176,087 B1 * | 1/2001 | Snyder et al. | | 60/737 |
| 6,490,864 B1 * | 12/2002 | Joos et al. | | 60/725 |
| 6,625,988 B2 * | 9/2003 | Weisenstein et al. | | 60/777 |
| 6,786,047 B2 | 9/2004 | Bland et al. | | |
| 6,834,506 B2 * | 12/2004 | Modi et al. | | 60/737 |
| 6,981,358 B2 | 1/2006 | Bellucci et al. | | |
| 7,000,403 B2 * | 2/2006 | Henriquez et al. | | 60/776 |
| 7,140,183 B2 * | 11/2006 | Ruck et al. | | 60/737 |
| 8,117,845 B2 * | 2/2012 | Lacy et al. | | 60/737 |
| 2004/0226297 A1 * | 11/2004 | Griffin et al. | | 60/737 |
| 2006/0260316 A1 | 11/2006 | Stuttaford | | |
| 2007/0074518 A1 * | 4/2007 | Rogers et al. | | 60/776 |
| 2008/0104961 A1 | 5/2008 | Bunker | | |
| 2008/0168773 A1 | 7/2008 | Sandelis | | |
| 2008/0190113 A1 | 8/2008 | Yoshida et al. | | |
| 2009/0249793 A1 * | 10/2009 | Nilsson et al. | | 60/780 |
| 2010/0064691 A1 * | 3/2010 | Laster et al. | | 60/737 |
| 2010/0146983 A1 * | 6/2010 | Hellat et al. | | 60/772 |

FOREIGN PATENT DOCUMENTS

WO    WO 2008033542 A2 *  3/2008

* cited by examiner

*Primary Examiner* — Gerald Sung
(74) *Attorney, Agent, or Firm* — Finnegan, Henderson, Farabow, Garrett & Dunner LLP

(57) ABSTRACT

A fuel injector arrangement for a turbine engine is disclosed. The fuel injector arrangement may have a combustion chamber, a plenum, an injector, and a premixing chamber configured to receive the injector. The premixing chamber may be at least partially disposed within the plenum and open to the combustion chamber. The premixing chamber may have at least one passageway configured to allow air from the plenum to enter and mix with fuel from the injector to form an air/fuel mixture within the premixing chamber, and a porous annular wall configured to allow air from the plenum to enter and create a lean boundary layer at the porous annular wall.

22 Claims, 2 Drawing Sheets

FUEL INJECTOR ARRANGEMENT HAVING POROUS PREMIXING CHAMBER

TECHNICAL FIELD

The present disclosure relates generally to a fuel injector arrangement of a turbine engine, and more particularly, to a fuel injector arrangement having a porous-walled premixing chamber.

BACKGROUND

Turbine engines typically include a compressor section that draws air into the engine and compresses the air, a combustor section that mixes the compressed air with fuel and ignites the mixture, and a turbine section that converts thermal energy of the combustion process to rotational energy. It has been recognized that the state of the fuel when injected and combusted can affect performance of the turbine engine. For example, it is known that premixing the fuel with the compressed air prior to the mixture entering the combustor section can improve ignition and combustion of the mixture. As such, turbine engines are commonly equipped with fuel injector arrangements having a premixing chamber fluidly connected between the compressor section and the combustor section.

Although effective at improving combustion, premixing chambers can also be problematic. That is, it may be possible in some situations for the premixing chamber of the fuel injector arrangement to overheat and be damaged, to become fouled, to produce insufficient mixing, or to promote flashback (i.e., to promote flame propagation from the combustion chamber back into the premixing chamber). Thus, an improved fuel injector arrangement is desired.

An exemplary turbine engine having a premixing chamber is described in U.S. Pat. No. 3,937,007 (the '007 patent) issued to Kappler on Feb. 10, 1976. Specifically, the '007 patent describes a turbine engine having a premixing chamber bounded by porous ceramic walls, a combustion chamber immediately adjacent the premixing chamber, and a porous ceramic diaphragm separating the premixing chamber from the combustion chamber. Air is forced into the premixing chamber through the porous ceramic walls of the premixing chamber, as well as into the combustion chamber via openings in the combustion chamber. A fuel injector injects fuel into the premixing chamber, where it is atomized, extensively mixed with air, and vaporized without combustion. The vaporized air/fuel mixture then flows into the combustion chamber through pores of the ceramic diaphragm so that the mixture entering the combustion chamber is burned. The premixing chamber of the '007 patent assists combustion stabilization and attemperation, while reducing a required length of the combustion chamber.

Although the premixing chamber of the '007 patent may help improve combustion, it may still be sub-optimal. That is, the ceramic diaphragm that closes off the premixing chamber from the combustion chamber may create undesirable backpressures within the premixing chamber, be prone to clogging, and be susceptible to cracking under extreme pressures and temperatures. And, because the premixing chamber of the '007 patent is closed off from the combustion chamber by way of the diaphragm, the combustion chamber requires additional dedicated passageways to bring secondary and tertiary flows of air to the combustion chamber. These additional passageways can increase a complexity and cost of the turbine engine.

The disclosed fuel injector arrangement is directed to overcoming one or more of the problems set forth above and/or other problems of the prior art.

SUMMARY

In one aspect, the present disclosure is directed to a fuel injector arrangement. The fuel injector arrangement may include a combustion chamber, a plenum, an injector, and a premixing chamber configured to receive the injector. The premixing chamber may be at least partially disposed within the plenum and open to the combustion chamber. The premixing chamber may have at least one passageway configured to allow air from the plenum to enter and mix with fuel from the injector to form an air/fuel mixture within the premixing chamber, and a porous annular wall configured to allow air from the plenum to enter and create a lean boundary layer at the porous annular wall.

In another aspect, the present disclosure is directed to a method of mixing fuel and air within a turbine engine. The method may include directing fuel into a chamber, and directing a flow of air into the chamber to create an air/fuel mixture within the chamber. The method may also include allowing the air/fuel mixture to exit an open end of the chamber, and diffusing air into the chamber through a wall of the chamber to create a lean boundary layer at the wall. The method may additionally include combusting the air/fuel mixture after it exits the open end of the chamber.

DETAILED DESCRIPTION

Figure 1:
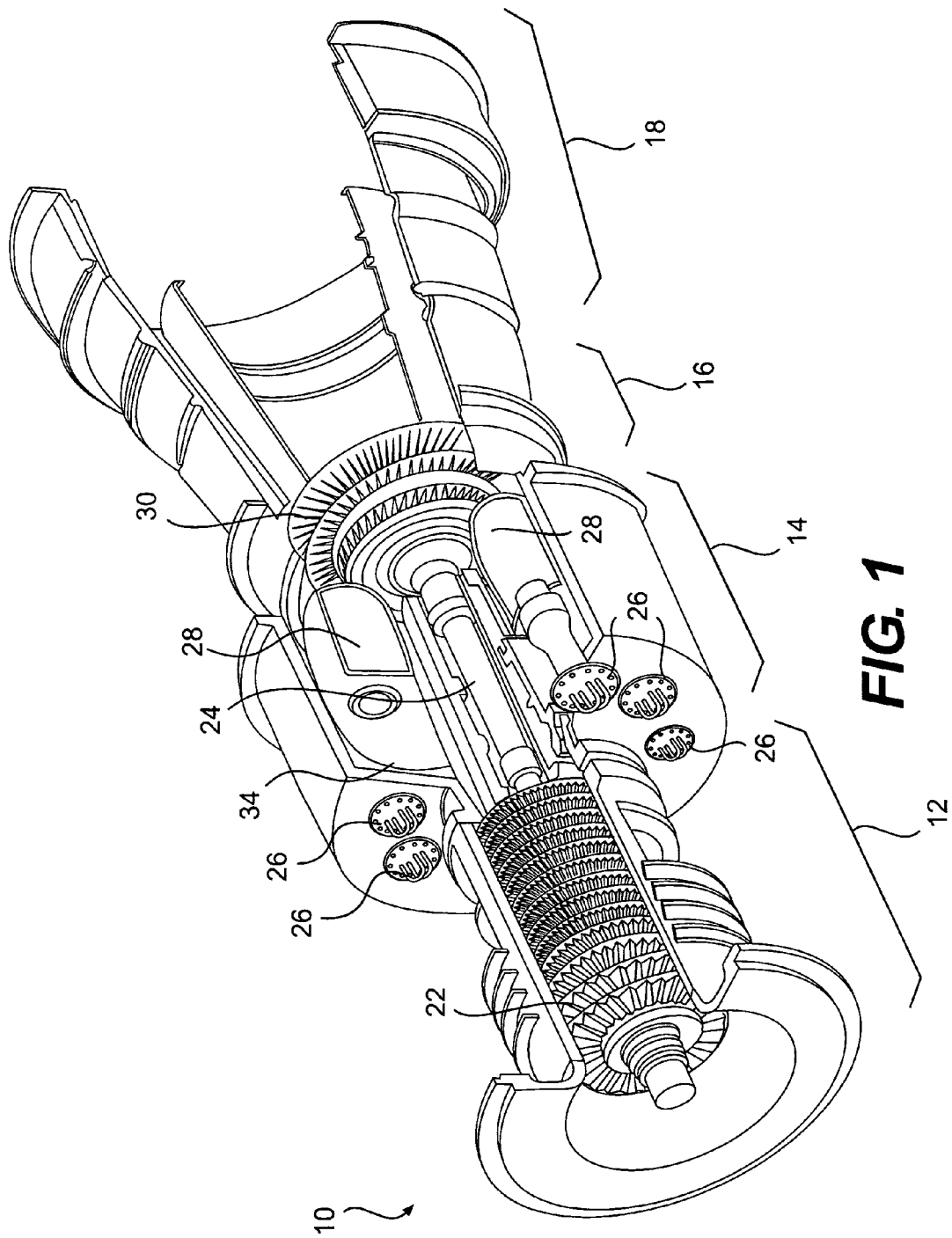
FIG. 1 is a cutaway-view illustration of an exemplary disclosed turbine engine.

FIG. 1 illustrates an exemplary turbine engine 10. Turbine engine 10 may be associated with a stationary or mobile machine configured to accomplish a predetermined task. For example, turbine engine 10 may embody the primary power source of a generator set that produces an electrical power output, or of a pumping mechanism that performs a fluid-pumping operation. Turbine engine 10 may alternatively embody the prime mover of an earth-moving machine, a passenger vehicle, a marine vessel, or any other mobile machine known in the art. Turbine engine 10 may include a compressor section 12, a combustor section 14, a turbine section 16, and an exhaust section 18 that cooperate to combust an air/fuel mixture and produce a power output.

Compressor section 12 may include components rotatable to compress inlet air. Specifically, compressor section 12 may include a set of rotatable compressor blades 22 fixedly connected about a central shaft 24. As central shaft 24 is rotated, compressor blades 22 may draw air into turbine engine 10 and pressurize the air. This pressurized air may then be directed toward combustor section 14 for mixture with a liquid and/or gaseous fuel. It is contemplated that compressor section 12 may further include compressor blades (not shown) that are separate from central shaft 24 and remain stationary during operation of turbine engine 10, if desired.

Combustor section 14 may mix fuel with the compressed air from compressor section 12, and combust the mixture to create a hot gas stream that can be used to provide mechanical work output. Specifically, combustor section 14 may include a plurality of fuel injector arrangements 26 annularly arranged about central shaft 24, and an annular combustion chamber 28 associated with fuel injector arrangements 26. Each fuel injector arrangement 26 may inject one or both of liquid and gaseous fuel into the flow of compressed air from compressor section 12 for ignition and combustion within combustion chamber 28. As the air/fuel mixture combusts, the resulting heated gas may expand and move at high speed into turbine section 16.

Turbine section 16 may include components rotatable in response to the flow of expanding exhaust gases from combustor section 14. In particular, turbine section 16 may include a series of rotatable turbine blades 30 fixedly connected to central shaft 24. As the hot gases flow past turbine blades 30, the reaction between the gas and turbine blades 30 may cause central shaft 24 to rotate, thereby converting combustion energy into useful rotational energy. This rotational energy may then be drawn from turbine engine 10 and used for a variety of purposes. In addition to powering various external devices, the rotation of turbine blades 30 and central shaft 24 may drive the rotation of compressor blades 22.

Exhaust section 18 may direct spent exhaust from combustor and turbine sections 14, 16 to the atmosphere. It is contemplated that exhaust section 18 may include one or more treatment devices configured to remove pollutants from the exhaust, and/or attenuation devices configured to reduce noise associated with turbine engine 10, if desired.

Figure 2:
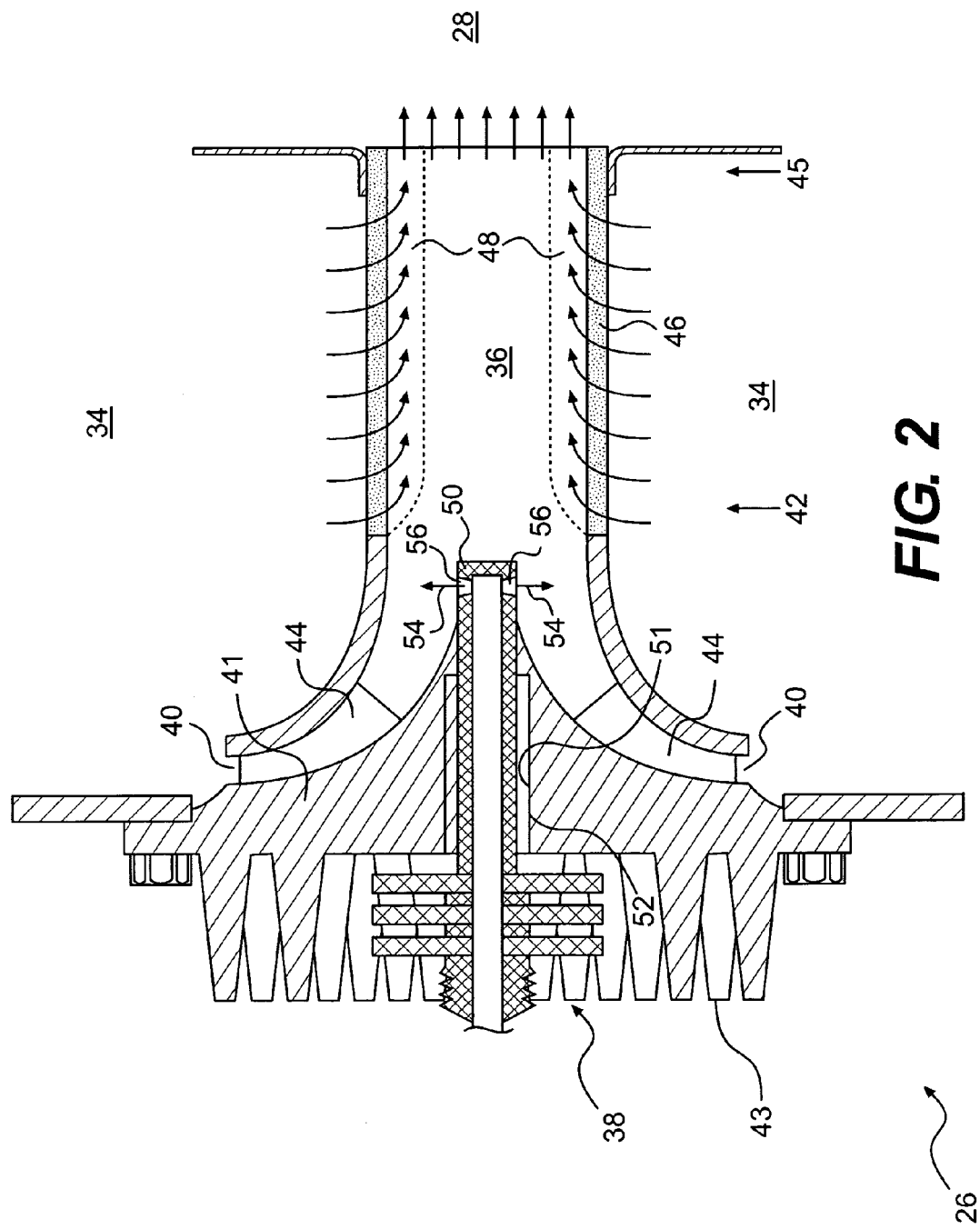
FIG. 2 is a cross-sectional illustration of an exemplary disclosed fuel injector arrangement that may be used with the turbine engine of FIG. 1.

As illustrated in the cross-section of FIG. 2, each fuel injector arrangement 26 may include components that cooperate to inject the mixture of compressed air and gaseous and/or liquid fuel into combustion chamber 28. Specifically, fuel injector arrangement 26 may include a barrel housing or plenum 34 having an inlet (not shown) for receiving compressed air from compressor section 12, a central body 36 forming a premixing chamber within plenum 34 and having an open end for discharging an air/fuel mixture to combustion chamber 28, and a fuel injector 38 extending at least partially into central body 36. Air from plenum 34 may mix with fuel from injector 38 and pass into combustion chamber 28 via central body 36.

Plenum 34 may be associated with a single fuel injector arrangement 26 or with multiple fuel injector arrangements 26. Specifically, plenum 34 may be an enclosure or chamber that substantially surrounds one or more fuel injector arrangements 26 and delivers pressurized air for use by those fuel injector arrangements 26. One or more passageways 40 integrally formed within a mounting member 41 may extend from plenum 34 into central body 36 at a first end 42 to direct a flow of pressurized air into central body 36 for combustion purposes.

Mounting member 41 may be operatively connected to plenum 34 by way of threaded fastening, and be configured to receive fuel injector 38. In one embodiment, mounting member 41 may include one or more cooling elements 43, such as structure configured to increase the heat transfer from fuel injector arrangement 26 by increasing the surface area exposed to surrounding air or other cooling fluid. In the depicted embodiment, cooling elements 43 are configured as pin type fins extending along an axial length of central body 36 and being configured to dissipate heat in multiple directions. It is contemplated that cooling fins 43 may be integrally formed with mounting member 41, or formed separately and then connected to mounting member 41.

In one embodiment, a vane 44 may be disposed within or otherwise form a portion of each passageway 40. Vane 44 may be situated to axially redirect a radial flow of compressed air from plenum 34. In particular, vane 44 may be located within a flow path of the compressed air and, as the compressed air contacts vane 44, it may be diverted from a radial inward direction to an axial direction without a substantial rotational component. In this manner, swirling of the incoming air may be substantially inhibited. In most applications, a velocity of the diverted air may increase as it moves toward a center of the flow (i.e., along a central axis of central body 36) relative to its value at a periphery of the flow.

Central body 36 may exemplify a generally hollow premixing chamber having first end 42 and a second end 45. Fuel injector 38 may be mounted at first end 42 thereby capping off first end 42, while second end 45 may be generally open to combustion chamber 28. An annular side wall 46 of central body 36 may be fabricated from any durable porous material, for example a ceramic foam, a metal, or a cera-metallic material such that pressurized air from plenum 34 may diffuse through wall 46 into central body 36. This diffusion of air into central body 36 may facilitate the creation of a boundary layer of air 48 at wall 46 having a lean air/fuel equivalence ratio unable to sustain combustion at the boundary layer conditions. The boundary layer of air 48, in most applications, may have a reduced axial velocity relative to the main flow within central body 36, approaching zero near wall 46. boundary layer 48 may help maintain an annular zone of incombustibility at the outer periphery of central body 36.

Fuel injector 38 may include a generally tubular member 50 located within a bore 51 of mounting member 41 and be configured to inject liquid or gaseous fuel radially outward toward the outer periphery of central body 36. Specifically, tubular member 50 may be disposed inward of vanes 44 and extend at least partially into central body 36 in an axial direction toward second end 45. In one example, an air gap 52 or another insulator may exist between tubular member 50 and bore 51 to provide thermal insulation for the fuel contained therein. It is contemplated, however, that air gap 52 may be omitted, if desired. Tubular member 50 may receive liquid and/or gaseous fuel such as, for example, No. 2 diesel or natural gas from a common manifold (not shown) located external of central body 36, and inject the fuel along the direction of arrows 54, radially outward via one or more orifices 56 during operation of turbine engine 10.

INDUSTRIAL APPLICABILITY

The disclosed fuel injector arrangement may be applicable to any turbine engine where efficient and consistent operation of the engine is desired. The disclosed fuel injector arrangement may improve efficiency by providing a premixing chamber, and improve efficiency by inhibiting flashback. The operation of fuel injector arrangement 26 will now be explained.

During operation of turbine engine 10, air may be drawn into turbine engine 10 and compressed via compressor section 12 (referring to FIG. 1). This compressed air may then be axially directed into plenum 34, radially through passageways 40, and against vanes 44 of fuel injector arrangement 26, where the flow may be axially redirected. As the flow of compressed air is turned to flow axially through central body 36, liquid and/or gaseous fuel may be passed from injector 38 radially outward into the flow of air for mixing prior to combustion. As the substantially homogenous mixture of fuel and air enters combustion chamber 28, it may ignite and fully combust. The hot expanding exhaust gases may then be expelled into turbine section 16, where the thermal energy may be converted to rotational energy of turbine blades 30 and central shaft 24.

Boundary layer 48 may be established at the outer periphery of central body 36 where the flow velocity is low to inhibit flashback from combustion chamber 28 into fuel injector arrangement 26. Specifically, compressed air from plenum 34 may be allowed to diffuse through the pores of central body 36 such that a standing zone of incombustibility is formed at wall 46. This zone of incombustibility may help inhibit flames from propagating into fuel injector arrangement 26.

Several advantages may be associated with fuel injector arrangement 26 of turbine engine 10. Specifically, because of the low concentration of fuel within boundary layer 48, there may be little risk of fouling, clogging, or flashback. This reduced risk of flashback may allow more freedom in designing a distribution of fuel within the mixture of central body 36. In addition, because boundary layer 48 created by incoming pressurized air may minimize the possibility of flashback, ceramic wall 46 of central body 36 may have little, if any, exposure to extreme pressures and temperatures. Further, the design of fuel injector arrangement 26 may be simple and low cost.

It will be apparent to those skilled in the art that various modifications and variations can be made to the disclosed fuel injector arrangement. Other embodiments will be apparent to those skilled in the art from consideration of the specification and practice of the disclosed fuel injector arrangement. It is intended that the specification and examples be considered as exemplary only, with a true scope being indicated by the following claims and their equivalents.

What is claimed is:

1. A fuel injector arrangement, comprising a combustion chamber; a plenum; an injector comprising a tubular member extending along a centerline axis of the fuel injector arrangement, the tubular member terminating at a distal tip, at least one fuel orifice formed in the distal tip; and a premixing chamber configured to receive the injector and being at least partially disposed within the plenum and open to the combustion chamber, the premixing chamber having: a mounting member containing at least one radial to axial passageway configured to allow air from the plenum to enter and mix with fuel from the injector to form an air/fuel mixture within the premixing chamber; and an annular side wall made of porous material located downstream of the mounting member and the distal tip of the injector, configured to allow air from the plenum to enter the premixing chamber and create a lean boundary layer at the annular side wall made of porous material.

2. The fuel injector arrangement of claim 1, further including at least one vane configured to inhibit swirl of the air entering the premixing chamber from the at least one radial to axial passageway.

3. The fuel injector arrangement of claim 2, wherein the at least one vane is disposed within the at least one radial to axial passageway.

4. The fuel injector arrangement of claim 2, wherein the at least one vane is operatively connected to the injector.

5. The fuel injector arrangement of claim 2, further including a thermal insulator associated with the injector.

6. The fuel injector arrangement of claim 5, wherein the thermal insulator is an air gap.

7. The fuel injector arrangement of claim 1, wherein the air from the at least one radial to axial passageway enters the premixing chamber at a location upstream of where the fuel from the injector enters the premixing chamber.

8. The fuel injector arrangement of claim 1, wherein a velocity of the air/fuel mixture at a center of the premixing chamber is greater than a velocity of the lean boundary layer.

9. The fuel injector arrangement of claim 8, wherein a velocity of the lean boundary layer is about zero.

10. The fuel injector arrangement of claim 1, wherein the air entering the premixing chamber via the annular side wall made of porous material forces the air/fuel mixture away from the annular side wall made of porous material.

11. The fuel injector arrangement of claim 1, wherein the injector is thermally insulated.

12. The fuel injector arrangement of claim 1, wherein the at least one orifice is oriented to spray fuel radially outward into the premixing chamber.

13. The fuel injector arrangement of claim 1, wherein annular side wall the made of porous material is fabricated from one of a ceramic, metallic, or cera-metallic material.

14. The fuel injector arrangement of claim 1, wherein the lean boundary layer is incombustible.

15. The fuel injector arrangement of claim 1, wherein an equivalence ratio of the lean boundary layer is below a combustion limit for conditions existing at the lean boundary layer.

16. The fuel injector of claim 1, further including:
the mounting member operatively connects the fuel injector to the plenum; and
at least one cooling fin connected to the mounting member.

17. A method of mixing fuel and air within a turbine engine comprising: a fuel injector arrangement, comprising a combustion chamber; a plenum; an injector comprising a tubular member extending along a centerline axis of the fuel injector arrangement, the tubular member terminating at a distal tip, at least one fuel orifice formed in the distal tip; and a premixing chamber configured to receive the injector and being at least partially disposed within the plenum and open to the combustion chamber, the premixing chamber having: a mounting member containing at least one radial to axial passageway configured to allow air from the plenum to enter and mix with fuel from the injector to form an air/fuel mixture within the premixing chamber; and an annular side wall made of porous material located downstream of the mounting member and the distal tip of the injector, configured to allow air from the plenum to enter the premixing chamber and create a lean boundary layer at the annular side wall made of porous material, the method comprising directing fuel into the premixing chamber, directing a flow of the air into the premixing chamber to create the air fuel/mixture within the premixing chamber; allowing the air/fuel mixture to exit an open end of the premixing chamber; diffusing the air into the premixing chamber through a wall of the premixing chamber to create the lean boundary layer at the annular side wall made of porous material; and combusting the air/fuel mixture after the air/fuel mixture exits the open end of the premixing chamber.

18. The method of claim 17, further including inhibiting swirling of the flow of air directed into the chamber.

19. The method of claim 17, wherein:
a velocity of the air/fuel mixture at a center of the chamber is greater than a velocity of the lean boundary layer at the wall; and
an equivalence ratio of the lean boundary layer is below a combustion limit for conditions existing at the lean boundary layer.

20. A turbine engine, comprising: a compressor section configured to pressurize air; a plenum configured to receive at least a portion of the pressurized air; an open ended premixing chamber at least partially disposed within the plenum and having a radial to axial passageway located at a first end to allow a flow of pressurized air from the plenum to enter the premixing chamber, and an annular side wall made of porous material configured to allow pressurized air from the plenum to diffuse into the premixing chamber and create a lean boundary layer at the annular side wall made of porous material; a fuel injector associated with the first end of the premixing chamber, the fuel injector being configured to inject fuel that mixes with the flow of pressurized air to form an air/fuel mixture; the fuel injector having a tubular member extending along a centerline axis of the premixing chamber, the tubular member terminating at a distal tip, at least one fuel orifice formed in the distal tip, wherein the annular side wall made of porous material is located downstream of the distal tip of the fuel injector, a combustion chamber configured to receive and combust the air/fuel mixture to generate a flow of exhaust; and a turbine section configured to convert at least a portion of a thermal energy in the flow of exhaust to mechanical energy.

21. A fuel injector arrangement, comprising: a mounting member containing at least one radial to axial passageway, a plurality of cooling fins attached on the mounting member, an injector at least partially disposed within the mounting member; and a central body at least partially defined by a premixing chamber extending axially from the mounting member and being configured to receive the injector.

22. The fuel injector arrangement of claim 21, wherein the plurality of cooling elements are pin fins extending in an axial length of the premixing chamber.

* * * * *